July 21, 1936. J. W. BULLER 2,048,596
SAW SET
Filed May 22, 1935

WITNESSES
Geo. W. Naylor
Chris Feinke.

INVENTOR
J. W. Buller
BY
Munn, Anderson & Liddy
ATTORNEYS

Patented July 21, 1936

2,048,596

UNITED STATES PATENT OFFICE 2,048,596

SAW SET

Jacob W. Buller, Hillsboro, Kans.

Application May 22, 1935, Serial No. 22,871

2 Claims. (Cl. 76—71)

This invention relates to a saw set and is primarily designed and adapted for setting teeth of circular and drag saws.

The principal object of the invention is the provision of a device of the indicated character which may be used for setting saw teeth of different sizes; one which may be used to vary the setting of the teeth according to the material to be sawn; and one which will be of substantial and efficient design.

The nature of the invention and its distinguishing features and advantages will appear when the following specification is read in connection with the accompanying drawing, in which—

Figure 1:
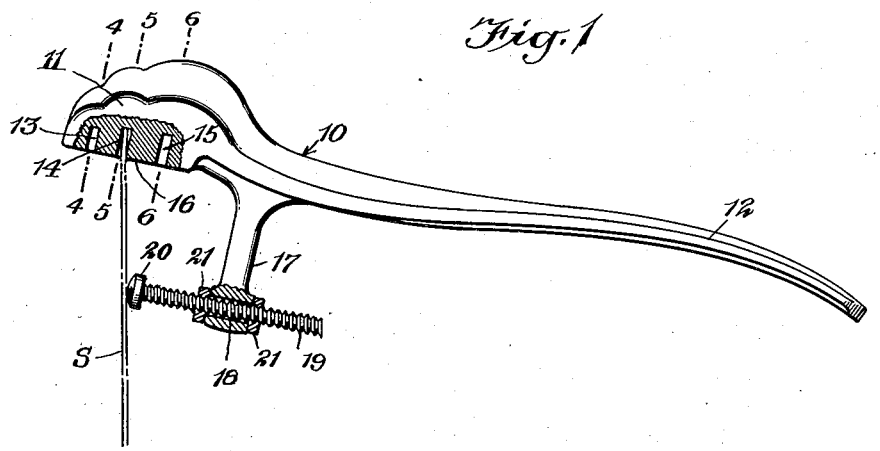
Figure 1 is a side view of a device embodying the features of the invention, the device being shown partly in section, and illustrating the manner in which it is used.
Figure 2:
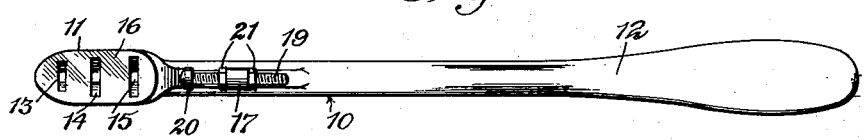
Figure 2 is a view of the device looking at the under side thereof.
Figure 3:
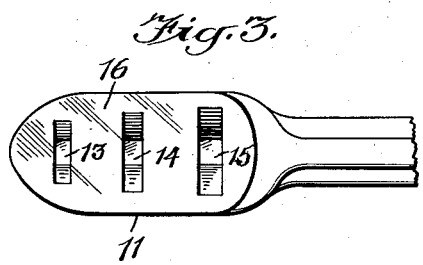
Figure 3 is an enlarged view of the tooth engaging end of the device looking at the under side thereof.
Figure 4:
Figure 4 is an enlarged section taken on the line 4—4 of Figure 1.
Figure 5:
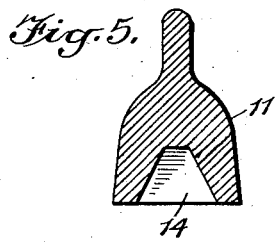
Figure 5 is an enlarged section taken on the line 5—5 of Figure 1.
Figure 6:
Figure 6 is an enlarged section taken on the line 6—6 of Figure 1.

Referring now more particularly to the drawing, it will be apparent that the device includes a rigid element 10 of metal and of any suitable length. This element embodies a tooth engaging end portion 11 and a handle 12 in continuation of said portion 11. The element 10 is of irregular formation so that the end portion 11 will have the desired bulk. The end portion 11 has recesses or holes 13, 14 and 15 therein, arranged in spaced relation to each other and opening through the under face 16 of said portion 11. The recesses 13, 14 and 15 are of various sizes to accommodate or receive saw teeth of different sizes. Each recess has length, width and depth. The recess 13 in actual practise is approximately ½ inch long, ⅛ inch wide and $\frac{1}{16}$ inch deep, the recess 14 is ⅝ inch long, $\frac{3}{32}$ inch wide and $\frac{1}{16}$ inch deep, and the recess 15 is 1¼ inch long, $\frac{1}{8}$ inch wide and ½ inch deep. It will therefore be apparent that the recess 13 accommodates relatively small teeth, the recess 15 accommodates relatively large teeth, and the recess 14 accommodates teeth of a size between those accommodated by the recesses 13 and 15. Each of said recesses is of such character as to substantially prevent the element 10 from slipping sidewise when a saw tooth is engaged therein. The element 10 has a bearing 17 projecting downwardly therefrom in proximity to the end portion 11. This bearing 17 has a plain bore 18 therethrough which accommodates a screw bolt 19 having a rounded head 20 on one end thereof. Nuts 21 are adjustable on the bolt 19 and are engageable with opposite sides of the bearing in order to hold the bolt 19 in various positions of adjustment with respect to the recesses 13, 14, and 15. The bolt 19, as adjustably mounted on the element 10, constitutes a stop gauge means with which the setting of the saw teeth may be adjusted.

When the device is placed over a saw with one of the teeth of the saw disposed in the recess 13, 14 or 15, by pressing downwardly on the handle 12 to cant the device, the tooth will be bent out to the right or left, as may be desired, and the head 20 of the bolt 19 will touch the saw, thereby limiting the degree of spread or bend given to the tooth. In this manner, the teeth of a saw may be set in equal manner, alternately to the right and left, to obtain the desired cutting effect, according to the material to be sawn. The bolt 19 may be readily adjusted by loosening the nuts 21, after which these nuts may be jammed against the bearing 17 to lock the bolt 19 in the adjusted position. The bolt 19 is long enough to take care of adjustments for the three recesses provided in the present instance. The bolt 19 is not only adjustable with respect to the recesses 13, 14 and 15 for setting teeth of different sizes, but also adjustable with respect to each recess to vary the setting of the particular size tooth accommodated by the recess.

It is to be understood that while there has been shown and described the three recesses or grooves of definite sizes, that any other suitable number of recesses or holes of any other sizes may be provided.

I claim:

1. In a saw set, a rigid setting element having spaced saw tooth receiving recesses therein, each of said recesses having length, width and depth, the end walls of each recess serving to substantially prevent said element from slipping sidewise when a saw tooth is disposed therein and said element is being canted to set the tooth.

2. A saw set comprising a rigid setting element having spaced saw tooth receiving recesses therein of various sizes, each of said recesses having length, width and depth, the end walls of each recess serving to substantially prevent said element from slipping sidewise when a saw tooth is disposed therein and said element is being canted to set the tooth, and a member mounted on said element for adjustment with respect to said recesses, and engageable with the saw to limit the canting of said element with respect thereto, to thus control the amount of bending of the tooth.

JACOB W. BULLER.